No. 779,816. PATENTED JAN. 10, 1905.
C. STEFFEN.
TREATMENT OF SUGAR BEARING MATERIAL.
APPLICATION FILED SEPT. 11, 1902.
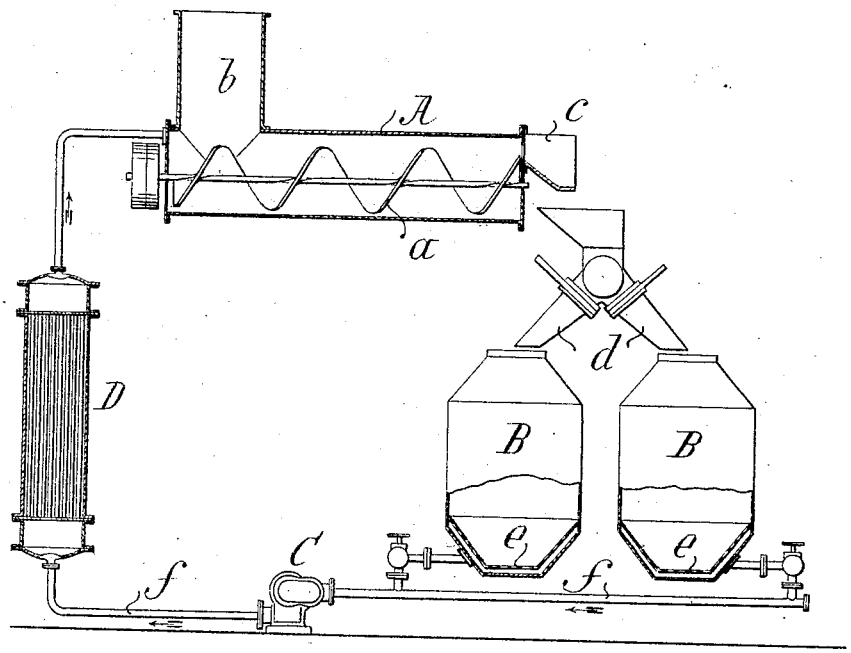

No. 779,816. Patented January 10, 1905.

UNITED STATES PATENT OFFICE.

CARL STEFFEN, OF VIENNA, AUSTRIA-HUNGARY.

TREATMENT OF SUGAR-BEARING MATERIALS.

SPECIFICATION forming part of Letters Patent No. 779,816, dated January 10, 1905.

Application filed September 11, 1902. Serial No. 123,030.

*To all whom it may concern:*

Be it known that I, CARL STEFFEN, a subject of the Emperor of Austria-Hungary, residing at Vienna, Austria-Hungary, have invented certain new and useful Improvements in Treatment of Sugar-Bearing Materials, of which the following is a specification.

This invention relates to the preliminary treatment of disintegrated beet-root or of disintegrated sugar-cane for the subsequent extraction of sugar-juices therefrom, which latter operation can be performed by means of the known diffusion process or by any desired pressing process.

I have found by experience that if the disintegrated raw materials intended for the extraction of sugar-juices, such as beet-root slices or slices or strips of sugar-cane, are suddenly submitted to a high temperature or caused to undergo suddenly a great change of temperature the result is that by means of the subsequent operations generally known and employed for the extraction of the sugar-juices a notable saving in time and labor and an increased yield in sugar and better quality of the raw juices will be obtained. This is due to the fact that the sudden heating of the cold disintegrated raw materials to temperatures between 50° and 100° centigrade (preferably between 85° and 90° centigrade) produces a strain or deformation of the vegetable structure of the treated materials and renders innocuous the organisms (such as leuconostoc, &c.) which are contained in the vegetable juice and are dangerous for the sugar. The deformation of the vegetable structure by sudden heating produces, on the one hand, a strong spontaneous eduction of the juice from the vegetable slices or strips and, on the other hand, the immediate coagulation, still within the vegetable cells, of the congealable albumen. In this manner the subsequent work of juice extraction by diffusion or by a pressing operation is diminished and purer juices are obtained. The said sudden increase of temperature of the disintegrated beet-root or sugar-cane is obtained according to the present invention in such a manner that these raw materials are rapidly mixed with sufficient quantities of heated beet-root juice or of sugar-cane juice. Experiments have shown that when one quantity, by weight, of the disintegrated raw material is mixed with the quadruple quantity, by weight, of the heated juices the compensation of the temperatures between the vegetable substances and the liquid will take place nearly as rapidly as if two liquids of different temperatures had been mixed together. The instantaneous transfer of the heat to the entire contents in juices of the vegetable substances, which takes place also when relatively coarse pieces or slices are treated, always enables the sudden heating of the vegetable substances to a mean temperature, which can be determined by calculation from the sums of the caloric quantities of the employed quantities of juice and of the disintegrated vegetable substances. If, for instance, four hundred pounds of juice possessing a temperature of 100° centigrade be mixed with one hundred pounds of beet-root slices of a temperature of 5° centigrade, the mixture will at once show an average temperature of 81° centigrade. Notwithstanding the beet-root slices have been submitted to the action of juice of 100° centigrade, they will not present in any part of their structure signs of scalding, (decomposition of their vegetable structure, &c.,) as it always occurs with the processes hitherto employed in the diffusion-batteries, if the slices in the diffuser are acted upon by a juice of 90° to 95° centigrade. Quite on the contrary the vegetable texture presents a more solid strength, and when the juice is being pressed out mechanically from the slices it shows a greater resistance.

The improved process is carried out in practice in the following manner, reference being had to the accompanying drawing, showing by way of example an apparatus suitable for carrying out the process.

Diffusion-juice (from beet-root or sugar-cane) is heated to temperatures of between 60° and 100° centigrade, preferably to 99° centigrade. This juice will in the following be called "heating-juice." The disintegrated beet-root or sugar-cane which is to be submitted to the diffusion process is admitted at one extremity $b$ of a long trough A, provided with an agitator $a$, (the scalding-trough.) The above-mentioned heating-juice is also introduced at the same end of the trough. The feeding of the said materials is effected in such a manner that for each part, by weight, of the vegetable slices continuously fed into the trough in a unit of time four parts, by weight, of the juice heated to temperatures of between 60° and 100° centigrade, preferably 99° centigrade—that is to say, of the above-mentioned heating-juice—are also continuously admitted into the scalding-trough. The juice and the slices are thoroughly mixed together by means of the agitator and are transported to the other end of the scalding-trough. Owing to the great quantity of the heating-juice, the said mixture of slices and juice possesses a rather liquid consistency. The discharge-aperture $c$ for the mixed materials at the opposite end of the trough is situated at a suitable height above the axis of the agitator, so that the trough above the said axis of the mixing device is constantly filled with the mixture of slices and juice. The said mixture, which has meanwhile assumed the mean temperature of the two constituent masses of the same, is conveyed from the discharge-aperture of the scalding-trough by means of suitable grooves $d$, &c., direct into the diffuser B of the corresponding diffusion-battery. The heating-juice is discharged from the diffuser through the perforated sieve-like bottom $e$ of the latter, while the slices remain in the diffuser, and in this manner the diffuser is successively filled with sliced material. The heating-juice flowing off through the perforated bottom of the diffuser is conveyed by means of a pump C and of suitable piping $f$ to calorisators or heating devices D for the purpose of heating it again to the temperature mentioned above, whereupon it is again fed to the admission-place of the scalding-trough A in order to be mixed again with suitable quantities of fresh slices of beet-root or of cane. The diffusion-juice obtained by means of the diffusion-battery from the vegetable slices thus heated is mixed together with the heating-juice, which is working in the described circulation, and the excess of heating-juice which accumulates in the said circulating process is drawn off for producing sugar therefrom. The heating-juices can also be discharged at the outlet end of the scalding-trough by means of feeding-screws, such as are used in the diffusion process for the removal of the exhausted slices which have undergone diffusion, whereby the slices are freed from the heating-juice and are thereupon fed, by means of suitable transporting devices of known construction, to the diffuser of the corresponding diffusion-battery. In this case the scalding-trough is provided at its discharge end with sieve-like openings, which are arranged at a suitable height above the axis of the mixing apparatus. Through these openings the exhausted heating-juice cooled down to the mean temperature is discharged from the said mixture and comes out free of slices, which remain in the trough, whereupon the said discharged juice without passing the diffusion-battery is forced direct, by means of a pump, into the said calorisator for the purpose of being there heated again and fed anew into the scalding-trough for the same renewed operation, as above described.

If sugar-cane or beet-root disintegrated in the shape of slices, &c., are to be submitted for the purpose of the extraction of the sugar-juices to a pressing operation, the vegetable slices, heated in the above described manner to temperatures of above 50° centigrade (for the pressing process preferably to 90° centigrade) by the introduction of the heating-juice into the scalding-trough, are separated from the heating-juice by means of the above-mentioned feeding-screws and are conveyed direct into the pressing apparatus, in which they are submitted to pressing while in a hot condition. The pressing out of the juices from these heated beet-root slices by means of the pressing apparatus usually employed for beet-root slices (screw-presses or roller-presses or bevel-wheel presses of known construction) will yield up to eighty per cent. of very pure juice for one single operation. Sugar-cane slices treated according to the described heating process will yield when employing simple pressing apparatus of known construction greater quantities of juice of purer quality with a less expenditure of motive power than the known old pressing processes.

The execution of the said improved process is by no means limited to the form of execution above described, but can be carried out in practice in various manners. The mixing of sufficiently great quantities of juice with corresponding quantities of disintegrated beet-root or sugar-cane must not absolutely be performed in one continuous operation. The process can also be carried out in such a manner that a considerable quantity of the juice heated to the above-named temperatures will be accumulated in a receptacle provided with a mixing device, and a corresponding quantity, by weight, of the disintegrated vegetable materials will be fed at once to the said receptacle. In this manner the heating of the vegetable material will be performed in separate quantities and in separate periods of time.

I am aware that prior to my invention disintegrated sugar-cane and beet-root have been heated during the extracting operation to facilitate the extraction of their juices. I therefore do not claim this as my invention; but I am not aware that disintegrated sugar-cane or beet-root has been subjected to a marked and sudden change of temperature before and preparatory to the extracting operation, such sudden change of temperature producing a strain or deformation of the vegetable structure of the treated materials and rendering innocuous dangerous organisms contained therein, as well as coagulating the congealable albumen contained therein.

I claim—

1. The herein-described process for the preliminary treatment of beet-root or sugar-cane, which consists in subjecting one part of disintegrated sugar-cane or beet-root to the action of four parts of heated sugar-cane juice or beet-root juice.

2. The herein-described process for the preliminary treatment of beet-root or sugar-cane, which consists in subjecting one part of disintegrated sugar-cane or beet-root to the action of four parts of sugar-cane juice or beet-root juice at a temperature of between 60° and 100° centigrade.

3. The herein-described process for the preliminary treatment of disintegrated beet-root or sugar-cane, which consists in subjecting the beet-root or sugar-cane to a marked and sudden change of temperature prior to the extracting operation, said marked and sudden change of temperature being effected in such manner that the vegetable structure of the treated material is strained or deformed with the effect of opening the cells but not destroyed or decomposed by scalding and the like, and dangerous organisms contained in the material are rendered innocuous.

4. The herein-described process for the preliminary treatment of disintegrated beet-root or sugar-cane, which consists in subjecting the beet-root or sugar-cane to a marked and sudden change of temperature prior to the extracting operation by treating said material with heated beet-root or sugar-cane juice, the weight of such juice exceeding that of the beet-root or sugar-cane, said marked and sudden change of temperature being effected in such manner that the vegetable structure of the treated material is strained or deformed with the effect of opening the cells but not destroyed or decomposed by scalding and the like, and dangerous organisms contained in the material are rendered innocuous.

5. The herein-described process for the preliminary treatment of disintegrated beet-root or sugar-cane, which consists in subjecting the beet-root or sugar-cane to a marked and sudden change of temperature prior to the extracting operation by treating one part of disintegrated beet-root or sugar-cane to the action of four parts of heated beet-root or sugar-cane juice, said marked and sudden change of temperature being effected in such manner that the vegetable structure of the treated material is strained or deformed with the effect of opening the cells but not destroyed or decomposed by scalding and the like, and dangerous organisms contained in the material are rendered innocuous.

6. The herein-described process for the preliminary treatment of beet-root or sugar-cane, which consists in subjecting the beet-root or sugar-cane to a marked and sudden change of temperature prior to the extracting operation by treating one part of disintegrated sugar-cane or beet-root to the action of four parts of sugar-cane or beet-root juice at a temperature of between 60° and 100° centigrade, said marked and sudden change of temperature being effected in such manner that the vegetable structure of the treated material is strained or deformed with the effect of opening the cells but not destroyed or decomposed by scalding and the like, and dangerous organisms contained in the material are rendered innocuous.

7. The herein-described process for the preliminary treatment of beet-root or sugar-cane which consists in rapidly subjecting disintegrated beet-root or sugar-cane to a temperature of from 50° to 99° centigrade by mixing said disintegrated beet-root or sugar-cane with a liquid having a temperature between 60° and 100° centigrade.

8. The herein-described process for the preliminary treatment of beet-root or sugar-cane which consists in suddenly subjecting disintegrated beet-root or sugar-cane to a temperature of from 50° to 99° centigrade by mixing said disintegrated beet-root or sugar-cane with beet-root or sugar-cane juice having a temperature of from 60° to 100° centigrade.

9. A process consisting in subjecting disintegrated sacchariferous plants to the action of heated sacchariferous juice, the weight of the latter exceeding that of the plants in order to secure a marked and sudden increase of temperature in the plants.

In testimony whereof I have hereunto set my hand in presence of two subscribing witnesses.

CARL STEFFEN.

Witnesses:
 C. B. HURST,
 AUGUST FUGGER.